United States Patent [19]
Euber

[11] Patent Number: 6,077,558
[45] Date of Patent: Jun. 20, 2000

[54] ELEMENTAL NUTRITIONAL PRODUCTS

[75] Inventor: John Euber, Evansville, Ind.

[73] Assignee: Bristol-Myers Squibb Company, New York, N.Y.

[21] Appl. No.: 09/220,217

[22] Filed: Dec. 23, 1998

[51] Int. Cl.[7] ................................ A23D 7/00; A23J 1/00; A23G 3/00; A23L 1/05; A23L 1/10
[52] U.S. Cl. ........................... 426/601; 426/656; 426/654; 426/658; 426/661; 426/801; 426/804
[58] Field of Search ..................................... 426/656, 801, 426/804; 601/654, 658, 661

[56] References Cited

U.S. PATENT DOCUMENTS 4,414,238  11/1983  Schmidl .
4,670,268   6/1987  Mahmoud .
5,609,909   3/1997  Meyer et al. .

Primary Examiner—Anthony J. Weier
Attorney, Agent, or Firm—Judith A. Roesler; John M. Kilcoyne; Wendell Ray Guffey

[57] ABSTRACT

An emulsifying system for elemental diet compositions is provided that comprises a protein source that may be a extensively hydrolyzed protein, free amino acids, short-chain peptides, or a mixture thereof; a lipid source; a carbohydrate source; and an emulsifying system comprising an ocentyl succinic anhydride modified starch and an acetylated monoglyceride emulsifier. The composition may be prepared as a powder or liquid nutritional composition for formulas prepared for infant, pediatric and adult populations in need of an elemental diet. The invention provides a commercially acceptable product in terms of desired stability and physical characteristics and is particularly useful for hypoallergenic infant formula preparations.

11 Claims, No Drawings

ELEMENTAL NUTRITIONAL PRODUCTS

FIELD OF THE INVENTION

This invention relates to an emulsifier system for liquid or powder nutritional products.

BACKGROUND OF INVENTION

In addition to its essential role in nutrition, protein is an important contributor to the physical properties of formulated foods including infant formulas and foods formulated for special medical purposes. Intact proteins and partially hydrolyzed proteins contribute to the emulsification of a fat component of a nutritional product due to their favorable hydrophilic-lipophilic balance that facilitates adsorption at the interface during preparation of product. Intact proteins and partially hydrolyzed proteins also contribute to forming a strong and cohesive interfacial film that minimizes droplet coalescence in the product resulting in a stable emulsion which allows manufacture of liquid and powder nutritional products with acceptable physical properties and shelf-life.

Foods containing extensively hydrolyzed protein and/or free amino acids are frequently referred to as elemental diet products. Elemental diets contain the altered protein components to fit with special medical purposes for a selected population with suspected protein allergy, protein intolerance, malabsorption disorders, or inborn errors of metabolism. Hypoallergenic infant formulas represent an important diet alternative for babies with demonstrated protein allergy to cow's milk. In contrast to intact protein or partially hydrolyzed protein, extensively hydrolyzed protein and amino acids have very poor or negligible emulsifying properties. In the products utilizing extensively hydrolyzed protein and/or free amino acids, commercially available emulsifiers have been used to achieve acceptable physical characteristics. One such emulsifier frequently used in infant formulas and other formulated nutritional products having extensively hydrolyzed or free amino acids is an octenyl succinic anhydride modified starch (hereinafter "OSA modified starch"). It is believed that the modification of the starch contributes to emulsion stability of the formulation by reducing the boundary tension between the immiscible fluids oil and water. The OSA starch is available commercially as intact (no molecular weight reduction) or dextrinized (molecular weight reduced by heat or enzymatic treatment and the like).

When proteins, hydrolyzed proteins and/or amino acids and carbohydrates are combined in an aqueous solution, these components have a tendency, especially with time and at elevated temperatures, to form a brownish solution and undesirable by-products due to the well-known Maillard reaction(s). This problem is particularly challenging for formulas prepared with extensively hydrolyzed proteins and/or free amino acids. U.S. Pat. No. 4,414,238 (Schmidl) teaches an elemental diet composition that uses an OSA modified starch in combination with a mono- and diglycerides emulsifier at a pH range of from about 3 to 4.4 to provide acceptable emulsification stability in conjunction to reduce the Maillard reaction. The pH range is attributed to providing an aqueous combination that is non-browning with time and at elevated temperatures and can be pasteurized or sterilized without the formation of Maillard reaction related by-products or undesirable browning.

U.S. Pat. No. 4,670,268 (Mahmoud) teaches that an OSA modified starch may be used in formulations with extensively hydrolyzed proteins at a higher pH of from 6 to 7. This patent also teaches that mono- and diglycerides, lecithin and polyglycerol esters of fatty acids were found to be ineffective in producing a stable hypoallergenic formula. As provided in Col. 4, lines 13–16 of U.S. Pat. No. 4,670,268, the hypoallergenic formula made with these emulsifiers yielded unstable emulsions and developed an objectionable cream layer within 24 hours of sterilization.

The OSA modified starch has been found incompatible with simple emulsifiers, as discussed in the prior art literature and exemplified in the Examples section herein. Thus, in commercially available nutritional products with extensively hydrolyzed proteins, dextrinized OSA modified starch is often used as a sole emulsifier in elemental diet compositions (see, e.g., U.S. Pat. No. 4,670,268).

While products with extensively hydrolyzed proteins and/or amino acids are commercially available, alternative emulsifying systems for elemental diets are needed.

SUMMARY OF INVENTION

An alternative emulsifying system for elemental diet compositions has been discovered. The inventive elemental diet composition comprises (a) a protein source selected from the group consisting of extensively hydrolyzed protein, free amino acids, short-chain peptides, or a mixture thereof; (b) a lipid source; (c) a carbohydrate source; and (d) an emulsifying system comprising OSA modified starch and an acetylated monoglyceride emulsifier.

The inventive composition may be prepared as a powder or liquid nutritional composition for formulas prepared for infant, pediatric and adult populations in need of an elemental diet. The inventive composition may be prepared as a nutritionally complete diet by including vitamins and minerals at acceptable levels. The invention provides a commercially acceptable product in terms of desired stability and physical characteristics and the product demonstrates little to no observable browning effect by-products associated with a Maillard reaction. Further, the inventive composition is substantially homogeneous for an acceptable period after reconstitution (or for the shelf-life if prepared as a liquid). The invention is particularly useful for hypoallergenic infant formula preparations, although it is equally applicable to other elemental diets specific to a selected population with suspected protein intolerance, malabsorption disorders, inborn errors of metabolism, and the like.

DESCRIPTION OF INVENTION

The protein source may be selected from any appropriate nitrogen sources, such as, extensively hydrolyzed protein, free amino acids, short-chain peptides and mixtures thereof appropriate for formulation of elemental diet compositions targeted for populations having specific nutritional needs. The actual amino acid/peptide content will depend upon the desired nutritional goals of the particular composition. Favored proteins include extensively hydrolyzed protein hydrolysates prepared from acid or enzyme treated animal and vegetable proteins, such as, casein hydrolysate, whey hydrolysate, casein/whey hydrolysate, soy hydrolysate, and mixtures thereof. By "extensively hydrolyzed" protein hydrolysates it is meant that the intact protein is hydrolyzed into peptide fragments whereby a majority of peptides fragments have a molecular weight of less than 1000 Daltons. More preferably, from at least about 75% (preferably at least about 95%) of the peptide fragments have a molecular weight of less than about 1000 Daltons. Free amino acids and synthetic short peptide chains may also be either substituted for or added to the protein hydrolysates as the nitrogen source so long as the nutritional composition has an amino acid profile suitable for the targeted population, as within the skill of one familiar with the art of nutritional formulations.

The amount of protein employed in the nutritional composition may be determined by the nutrient profile targeted for a specific formulation, as well known to those skilled in the art. For example, for infant formulas, the protein source typically comprises approximately from about 8 to about 20 percent of total calories, more preferably from 10 to 12 percent of the total calories of the nutritional composition.

The lipid or fat source may be any FDA approved natural and/or synthetic oil that is edible and acceptable for use in elemental diet compositions, employed in an amount suitable for the desired nutritional balance for the specific formulation, as known to those skilled in the art. For example, for infant formulas, the fat source will contribute from about 35 to about 55 percent of total calories, more preferably from 40 to 50 percent of total calories of the nutritional composition. Nutritional formulas generally employ linoleic acid in amounts ranging from about 2.7 to about 10 percent of the total calories of the formula to meet typical nutritional goals, particularly if the formula is nutritionally complete. Suitable fat sources include medium chain triglycerides (MCT), synthetic and vegetable oils, including but not limited to palm olein, soy, coconut, and high oleic sunflower oils and the like, as well known in the art. The acetylated monoglycerides emulsifier used in accordance with this invention may be factored into the total fat content of the overall composition on a w/w basis, as discussed in more detail hereinafter.

The carbohydrate source may be selected from any FDA approved natural and/or synthetic carbohydrates, including by way of example, maltodextrin, polydextrose, dextrose, sucrose, lactose, mixtures thereof, and so on. The carbohydrate component may be added in amounts desired in the nutrient profile of the final composition. For example, the carbohydrate may be contribute anywhere from about 35 percent to about 70 percent of total calories, preferably from 40 to 50 percent for infant formulas. Additionally, the OSA modified starch that is part of the emulsifier system of the invention contributes to the carbohydrate content of the final formulation and may be included in the total carbohydrate.

In one preferred embodiment, glucose polymers comprise the primary source of carbohydrate. In this preferred embodiment, glucose polymers are favored because of their formulation properties and because they are considered more easily digested and tolerated by infants whose capacity to handle lactose and sucrose may be impaired. The preferred glucose polymers are prepared utilizing filtration and purification procedures which remove virtually all traces of protein. Preferably at least about 50%, more preferably at least about 70% of the total carbohydrate is comprised of glucose polymers having a degree of polymerization of from 3 to 7, and a preferred average of four glucose units. Based on cost and availability, the preferred glucose polymers are used in the form of corn syrup solids, although the syrup may also be prepared from rice, sorghum, tapioca, barley, and the like. Particularly useful as a carbohydrate source are corn syrup solids having a degree of polymerization of about an average of four glucose or and a dextrose equivalents (DE) of about 24. For the preferred embodiment, the selection of the carbohydrate source is believed to assist in preparing a final formulation that substantially avoids observable browning attributed to a Maillard reaction without requiring that the formula be highly acidic.

The inventive composition may be prepared having a pH level acceptable to the targeted specification of the elemental diet, so long as the Maillard reaction by-products are avoided to the point of preparing a commercially acceptable product. It has been found that in a preferred embodiment, the final formula may be prepared to have a pH level of from about 5 to about 6. The pH level of between about 5 and 6 is advantageous as highly acidic formulations are inappropriate for infant formula compositions. Specifically, it has been found particularly advantageous to adjust the pH to a value less than 6 but greater than 5, and most preferably at a value of approximately 5.5 in some formulations.

In addition to the essential protein, lipid and carbohydrate content, the nutritional compositions may include other ingredients such as, for example, vitamins, minerals, non-essential amino acids, pH modifiers (such as citric acid or potassium hydroxide), stabilizers (such as carageenan), fiber, functional ingredients, and the like, in a manner well known to those skilled in the art to achieve the desired nutritional goal of the element diet composition.

Unexpectedly, it is has been found that acetylated monoglyceride emulsifiers are compatible with an OSA modified starch emulsifier and provide an effective emulsifier system for elemental diets. Edible acetylated monoglycerides are widely available commercially, including by way of example, CETODAN® 90-50 (Danisco Ingredients, New Century, Kans. 66031); and MYVACET® 9-08 and MYVACET 9-45 (Eastman Chemical Company, Kingsport, Tenn. 37662). Combinations of the commercially available acetylated monoglycerides may also be employed. Preferably the acetylated monoglycerides have a degree of acetylation from about 90 to about 100% and an iodine value from about 2 to about 5. Acetylated monoglycerides are within the lipid category, and thus the amount of lipid in the formulation should be reduced or offset according to the amount of added acetylated monoglyceride(s), as within the capabilities of those skilled in the art.

Because it has been found that the intact OSA modified starch has been found to be more rugged in terms of stability (as compared to dextrinized OSA modified starch), intact OSA starch is more desirable for some applications. Intact OSA modified starch is widely available commercially, as prepared for example, by esterifying a waxy grain (corn, rice, tapioca, etc.) starch with 1-ocetnyl succinic anhydride. Commercially available dextrinized and intact OSA modified starches are prepared by esterifying of a waxy corn starch with octenyl succinic anhydride are particularly well-suited for the present use and include, by way of example, E-Z FILL (Cerestar USA Inc., Hammond, Ind. 46320); NATIONAL 6912 (National Starch and Chemical Corporation, Bridgewater, N.J. 08807); and STALEY 365 (A. E. Staley Manufacturing Company, Decatur, Ill. 62525).

The OSA modified starch and acetylated monoglyceride emulsifier system is added to the formulation in an amount effective to provide a commercially acceptable stable formulation. The amount may be determined based on the emulsification needs of the formulation. For example, combinations of from about 0.1 about 10 weight percent OSA modified starch and from about 0.01 to about 7.5 acetylated monoglyceride emulsifier may be employed. As used herein, weight percentages of the OSA modified starch and acetylated monoglyceride emulsifier are based on the total weight of the inventive composition prepared in a ready to feed form (i.e., powder form is reconstituted or liquid concentrate is diluted by the addition of water). An ideal combination of emulsifiers comprises from about 0.5 to about 2 weight percent OSA modified starch and from about 0.04 to about 0.1 weight percent acetylated monoglperide emulsifier.

A liquid elemental diet product is often more challenging to formulate as compared to formulating a powder product because the liquid product ingredients must be suspended in a commercially acceptable uniform manner over the shelf-life of the liquid product. It has been found that more OSA starch may be required when formulating liquid products compared to powder products. For liquid products, preferably from about 1 to about 1.7 (more preferably 1.6 to 1.7) weight percent OSA modified starch is used. For powder products, preferably from about 0.7 to about 1.5 (more preferably 0.9 to 1.1) weight percent OSA modified starch is used. The preferred amount of acetylated monoglyceride employed in the emulsifier system may range from 0.04 to about 0.1 weight (most preferably, from about 0.05 to about 0.07 weight percent) for either powder or liquids. The more preferred ratio of OSA modified starch:acetylated monoglyceride is from about 85 to about 97 parts OSA modified starch to 3 to 15 parts acetylated monoglycerides, most preferably for liquids about 96 parts OSA modified starch to about 4 parts acetylated monoglyceride.

The compositions of the invention exhibit desired stability as measured by a number of known tests used within the nutritional industry. Criteria for evaluating the stability include measurements of average fat globule diameter prior to and following sterilization and/or freeze thaw treatment as shown in the Example section hereinafter. Further, to meet the demands of a commercial product, the compositions may be evaluated in terms of physical properties, including the appearance of products in quiescent storage, in particular, creaming, free oil, and serum formation (i.e., product homogeneity).

The following non-limiting examples are illustrative of the invention disclosed herein.

EXAMPLES

Evaluation Criteria

Fat Globule Size Distribution. The fat globule size distribution was determined using laser diffraction (Coulter Corporation LS130, Miami, Fla.). The fat globule size, often referred to as droplet size, is an important property for characterization of emulsions. The droplet size distribution of the emulsions influences properties such as stability, viscosity, texture and mouthfeel. (See, "Stability of Food Emulsions: Physicochemical Role of Protein and Nonprotein Emulsifiers," K. P. Das and J. E. Kinsella, *Advances in Food and Nutrition Research*, Volume 34, J. E. Kinsella, ed., 1990. Academic Press.) The fat globule size distribution, with a maximum of low diameter droplets generally represents a situation of maximum stability. Thus, formulas with smaller fat globule size values are more desirable than those formulas having larger fat globule size values as a lower value indicates that the formula has a better emulsion. (See, *Emulsions: Theory and Practice*, 2nd ed., page 49, P. Becher, 1965, Reinhold Publishing Corp.) Sterilization and freeze/thaw conditions challenge the stability of a nutritional product once reconstituted if a powder or if prepared as a liquid. Post-sterilization shaking (4° C. for 48 hours) also provide an evaluation criterion to check the formulation for stability and ruggedness. Thus, fat globule measurements were conducted after these treatments. Preferably, an ready-to-use (RTU) product prepared in accordance to the invention will have a mean fat globule diameter measurement of less than about 0.8 microns after subjected to post-sterilization testing, less than about 1.5 microns after subjected to freeze/thaw treatment. Preferably a concentrate product prepared in accordance to the invention will have a mean fat globule diameter measurement of less than about 0.8 microns after subjected to post-sterilization testing; less than about 1.5 microns after subjected to freeze/thaw treatment. Further, after a five second shake, a reconstituted powder product prepared in accordance with the invention will have less than about 14 g sediment per 100 g powder and less than about 6 g per 100 g powder after a fifteen second shake. Physical property evaluation may be conducted by observing the appearance of products in quiescent storage. In particular, creaming (concentration of emulsified fat in the upper layers of the product), serum formation (development of a clear or fat-free product zone, usually at the bottom of the product container) and free oil (oil that is no longer emulsified, on the product surface).

Example 1

A ready-to-use (RTU) hypoallergenic infant formula product was prepared using a dextrinized OSA modified starch in combination with a number of simple emulsifiers of different classes. As used herein, a ready-to-use product is a "ready to feed" product, where no dilution or reconstitution is needed prior to feeding. The formula was prepared using a hypoallergenic infant formula base modeled after a commercially available formula NUTRAMIGEN® (protein source enzymatically hydrolyzed casein specially treated to reduce allergenicity and supplemented with three amino acids, L-cystine, L-tryrosine, and L-tryptophan) whereby the composition utilized an emulsifier system of 1.62 weight percent (based on total weight of formula) of dextrinized OSA modified and 0.03 weight percent (based on total weight of formula) simple emulsifier as identified in TABLE 1 hereinafter,

TABLE 1

HYPOALLERGENIC FORMULA READY TO USE (RTU)
(Total Batch Weight 10,000 grams)

| Corn syrup solids (24 DE) | 557.5 grams |
|---|---|
| Dextrinized OSA Modified Starch[a] | 161.5 |
| Citric acid | 8.44 |
| Palm olein oil | 147.2 |
| Soy oil | 65.4 |
| Coconut oil | 65.4 |
| High oleic sunflower oil | 49.1 |
| Simple Emulsifier (Identified in TABLE 2) | 3.27 |
| Protein hydrolysate (casein) | 218.6 |
| L-Carnitine | 0.181 |
| Amino acid premix | 4.24 |
| Calcium phosphate tribasic | 14.79 |
| Potassium citrate | 7.77 |
| Potassium chloride | 4.92 |
| Calcium carbonate | 2.91 |
| Magnesium oxide | 1.19 |
| Ferrous sulfate | 0.61 |
| Choline chloride | 1.28 |
| Vitamin A,D,E,K premix | 0.409 |
| Dry vitamin premix | 5.02 |
| Trace/Ultratrace mineral premix | 3.00 |
| Carrageenan | 9.43 |
| Water | As required |

[a]N-Creamer 46, National Starch and Chemical Company, Bridgewater, NJ.

The formula of TABLE 1 was prepared using the following procedure: Water (4000 grams) was heated to 145–150° F. While the water was heating the corn syrup solids and starch (dry blended together) were added. Protein hydrolysate, amino acid premix and L-carnitine (dry blended) were added to the water mixture. Thereafter soluble minerals (mixed in 200 ml of water) were added, followed by insoluble minerals (mixed in 200 ml water). Oils, simple emulsifier, vitamin A, D, E, K premix and carrageenan (premixed) were then added. Choline chloride, ferrous sulfate, trace mineral premix and citric acid (which have been mixed in 150 ml water) were then added. This mixture was then heated to about 245 ° F. using steam injection, held for approximately 45 seconds and cooled to 150 to 160 ° F. The preparation was then homogenized twice using a second stage pressure of 500 psig and first stage pressure of 3500 psig.

The hypoallergenic formula above was subjected to pre-sterilization measurement of product fat globule diameters (mean provided); post-sterilization measurement of product fat globule diameters (mean provided); and physical properties observation for each emulsifier tested, as shown in TABLE 2, hereinafter.

TABLE 2

Hypoallergenic Formula: Dextrinized OSA Starch with Various Emulsifier Classes
Mean Fat Globule Size / Physical Properties

| Emulsifier Class | Emulsifier | Pre-sterilization Mean Fat Globule Size (microns) | Post-sterilization Mean Fat Globule Size (microns) | Physical Properties |
|---|---|---|---|---|
| Acetylated Monoglycerides | CETODAN ® 90-50[a] | 0.459 | 0.793 | Good |
| Diacetyl Tartaric Acid Esters of Monoglycerides | PANODAN ® FDPK[a] | 0.468 | 2.888 | Poor |
| | PANODAN ® SDK[a] | 0.470 | 2.180 | Poor |
| Citric Acid Esters of Monoglycerides | ACIDAN N ® 12[a] | 0.689 | 2.021 | Poor |
| Sodium Stearoyl Lactylate | EMULSILAC ® S[b] | 0.630 | 1.266 | Good |
| | MYLVEROL ® SMG-V[c] | 0.340 | 2.072 | Poor |
| Propylene Glycol Esters of Monoglycerides | ALDO ® PGHMS[d] | 0.418 | 0.839 | Good |
| Sucrose Esters | S-1670[e] | 0.652 | 3.370 | Poor |
| | S-270[e] | 0.614 | 1.640 | Poor |
| | O-1570[e] | 0.639 | 3.310 | Poor |
| | L-1695[e] | 0.545 | 2.039 | Poor |
| Lactic Acid Esters of Monoglycerides | ATMUL ® 2622K[b] | 0.432 | 0.878 | Good |
| Lecithin | BLENDMAX ® 322D[f] | 0.590 | 2.186 | Poor |
| | ALCOLEC ® SFG[g] | 0.431 | 2.498 | Poor |
| | ALCOLEC 140[g] | 0.601 | 2.876 | Poor |
| | MCTHIN ® AF-1[h] | 0.456 | 2.940 | Poor |
| Mono- and Diglycerides | HODAG ® GMO[i] | 0.576 | 1.040 | Poor |
| | HODAG ® GMS[i] | 0.423 | 1.118 | Poor |
| | HODAG GML[i] | 0.433 | 1.028 | Poor |
| | ATMUL 80[b] | 0.447 | 0.894 | Poor |
| | ATMUL 86K[b] | 0.427 | 0.886 | Poor |
| | ATMUL 84[b] | 0.593 | 0.882 | Poor |
| No Emulsifier (CONTROL) | | 0.611 | 0.680 | Good |
| | | 0.446 | 0.808 | Good |
| | | 0.455 | 0.737 | Good |
| | | 0.450 | 0.709 | Good |

Emulsifier Manufacturers:
[a]Danisco Ingredients, New Century, KS
[b]Eastman Chemical Co., Kingsport, TN
[c]Witco Corporation, Memphis, TN
[d]Lonza Inc., Williamsport, PA
[e]Mitsubishi Kasei America, Inc., White Plains, NY
[f]Central Soya Company, Fort Wayne, IN
[g]American Lecithin Company, Danbury, CT
[h]Lucas Meyer Inc., Decatur, IL
[i]Calgene Chemical Company, Skokie, IL As depicted in TABLE 2, the results distinguish the present invention from the use of OSA modified starch used in combination with a mono- and diglyceride emulsifier (as taught, in combination with an acidic pH of 3.0 to 4.4, by U.S. Pat. No. 4,414,238). Per TABLE 2, physical properties of those formulas prepared with mono- and diglycerides were described as having "Poor" physical properties.

Example 2

A hypoallergenic infant formula was prepared as in TABLE 1, Example 1 where dextrinized OSA modified starch was used in combination with one of the following simple emulsifiers: (1) acetylated monoglycerides; (2) lactic acid esters of monoglycerides; or (3) propylene glycol monoesters. Each preparation was subjected to mean fat globule measurement pre-sterilization, post-sterilization, and after one freeze/thaw cycle. Additionally the preparation was subjected to a post-sterilization/cold shake treatment where the product was shook at 4° C. for 48 hours to assess emulsion stability or ruggedness. A control product containing no added simple emulsifiers was also prepared and similarly tested.

TABLE 3

RTU Hypoallengeric Infant Formula Product with Dextrinized
OSA Modified Starch and Simple Emulsifiers
Mean Fat Globule Size (microns)

|  | Pre-sterilization | Post-sterilization | Post-freeze thaw treatment | Post-cold shake treatment |
|---|---|---|---|---|
| No Emulsifier (CONTROL) | 0.446 | 0.808 | 4.601 | 0.665 |
| Acetylated Monoglyceride (CETODAN 90-50) | 0.508 | 0.819 | 5.620 | 0.650 |
| Propylene Glycol Esters of Monoglycerides (ALDO PGHMS) | 0.434 | 0.794 | 12.32 | 1.159 |
| Lactic Acid Esters of Monoglycerides (ATMUL 2622K) | 0.581 | 0.953 | 6.598 | 7.396 |

Products containing propylene glycol monoesters and lactic acid esters of monoglycerides had poor physical properties following freeze thaw and cold shake treatments as compared with products prepared with acetylated monoglycerides. Thus, the data in Tables 2 and 3 demonstrated that all emulsifiers are not equivalent in yielding a stable product. Acetylated monoglycerides used in conjunction with OSA modified starch were found to yield more stable nutritional compositions when compared with other simple emulsifiers used in conjunction with OSA modified starch.

Example 3

RTU and concentrate base preparations were made using the hypoallergenic infant formula base as described in TABLE 1, Example 1, where OSA modified dextrinized or intact starch was used as the sole emulsifier. No simple emulsifiers were included. Concentrate carrageenan level was reduced to 450 ppm and total solids adjusted to 24.9%, w/w, prior to sterilization. Products were prepared in two sets. The first set used 100 % of the OSA modified starch level described in Example 1. The second set used only 60% of the OSA modified starch level used in Example 1, and corn syrup solids were increased by an amount equivalent to the starch reduction amount. Two groups of tests were conducted. The first set had a pre-sterile and post-sterile fat globule measurement, as reported in TABLE 4. The second set had a pre-sterilization, post-sterilization, and post freeze/thaw fat globule measurement, as reported in TABLE 5.

TABLE 4

Hypoallergenic Formulas using 100% OSA Modified Starch Level
per TABLE 1, Example 1
Mean Fat Globule Size (microns)

| Starch and use level | Product form | Pre-sterile | Post-sterile |
|---|---|---|---|
| Intact OSA Modified Starch E-Z FILL[a], 100% | RTU | 0.520 | 0.652 |
| Intact OSA Modified Starch E-Z FILL[a], 100% | RTU | 0.482 | 0.672 |
| Intact OSA Modified Starch E-Z FILL[a], 100% | RTU | 0.598 | 0.636 |
| Intact OSA Modified Starch STALEY 365[b], 100% | RTU | 0.460 | 0.662 |
| Dextrinized OSA Modified Starch N-CREAMER 46[c] | RTU | 0.491[d] | 0.734[d] |

[a]Cerestar USA Inc., Hammond, IN
[b]A.E. Staley Manufacturing Company, Decatur, IL
[c]National Starch and Chemical Co., Bridgewater, NJ
[d]Mean of 4 formulas listed in TABLE 2 of Example 1

TABLE 5

Hypoallergenic Formulas using 60% OSA Modified Starch
per TABLE 1, Example 1
Mean Fat Globule Size (microns)

| Starch and use level | Product form | Pre-sterilization | Post-sterilization | Post-freeze thaw treatment |
|---|---|---|---|---|
| Intact OSA Modified Starch (E-Z FILL, 60%) | RTU | 0.442 | 0.659 | 4.557 |
| Intact OSA Modified Starch (E-Z FILL, 60%) | Concentrate | 0.418 | 0.780 | 1.225 |
| Dextrinized OSA Modified Starch N-CREAMER 46 (60%) | RTU | 0.356 | 1.587 | 6.290 |
| Dextrinized OSA Modified Starch N-CREAMER 46 (60%) | Concentrate | 0.462 | 3.090 | 4.511 |

The first set of RTU products containing 100% of the starch level exhibited similar physical properties whether intact or dextrinized OSA modified starch was used. The second set of RTU products containing 60% of the starch level exhibited similar pre-sterilization properties, however, after sterilization the dextrinized OSA modified starch products exhibited poorer physical properties such as more rapid creaming and serum formation. These data demonstrate that the intact starches are more stable or rugged through sterilization and a freeze thaw treatment as evidenced by superior physical properties and fat globule size results at the lower starch concentration.

Example 4

Hypoallergenic infant formulas in RTU and concentrate forms were prepared as described in Example 1 using intact OSA modified starch (E-Z FILL, 100% use level) and acetylated monoglycerides (CETODAN 90-50, levels as specified). RTU products containing varied levels of acetylated monoglyceride were subjected to freeze thaw and cold shake treatments.

TABLE 6

Hypoallergenic Formulas with Intact OSA Modified Starch
Mean Fat Globule Size (microns)

| Product form | Acetylated monoglyceride Use Level, %, w/w[a] | Pre-sterilization | Post-sterilization | Post-freeze thaw treatment | Post-cold shake treatment |
|---|---|---|---|---|---|
| RTU | 0 | 0.685 | 0.708 | — | — |
| RTU | 0.066 | 0.531 | 0.671 | — | — |
| Concentrate | 0 | 0.620 | 1.142 | — | — |
| Concentrate | 0.132 | 0.489 | 0.741 | — | — |
| RTU | 0 | 0.450 | 0.631 | 1.312 | 0.674 |
| RTU | 0.066 | 0.476 | 0.628 | 1.014 | 0.673 |
| RTU | 0.099 | 0.472 | 0.640 | 0.988 | 0.711 |
| RTU | 0.132 | 0.478 | 0.671 | 0.892 | 0.661 |

[a]Weight percentage based on the total weight nutritional composition in a ready to feed form.

The infant formula concentrate containing acetylated monoglycerides with intact OSA modified starch was observed to have less free surface oil relative to the product without acetylated monoglycerides (as tested upon quiescent standing). The infant formula RTU products containing acetylated monoglycerides exhibited improved freeze thaw stability as compared to product without the acetylated monoglycerides.

Example 5

Hypoallergenic infant formula in a RTU form was prepared as described in Example 1 using intact OSA modified starch (E-Z FILL, 100% use level) and acetylated monoglycericles (source as specified, 0.066% w/w, based on the total weight of the ready to feed formula). A control product using dextrinized starch and no simple emulsifiers was also prepared.

TABLE 8

RTU Hypoallergenic Infant Formula Having an Emulsifier System of
Intact OSA Modified Starch and an Acetylated Monoglyceride
Mean Fat Globule Size (microns)

| Acetylated Monoglyceride | Pre-sterilization | Post-sterilization |
|---|---|---|
| CONTROL (Dextrinized OSA Modified Starch Only) | 0.641 | 0.952 |
| CETODAN 90–50[a] | 0.448 | 0.702 |
| MYVACET® 9-08[b] | 0.363 | 0.684 |
| MYVACET® 9-45[b] | 0.452 | 0.687 |

Emulsifier manufacturers:
[a]Danisco Ingredients, New Century, KS 66031.
[b]Eastman Chemical Company, Kingsport, TN 37662.

The three acetylated monoglyceride emulsifiers functioned similarly. The product testing showed physical characteristics in line with targeted values for commercially acceptable products.

Example 6

An experiment was conducted using a simple model system to further investigate the role of acetylated monoglycerides in improving emulsion properties when used in combination with intact OSA modified starch. The system consisted of water, oil, starch, simple emulsifier and salts. Exact formulations and processing procedure are listed in TABLE 9, as follows.

TABLE 9

Simple System Evaluation of Acetylated Monoglycerides Formulations
Ingredient Amount (grams)

| | Sample 1 | Sample 2 | Sample 3 | Sample 4 | Sample 5 | Sample 6 | Sample 7 |
|---|---|---|---|---|---|---|---|
| Intact OSA Modified Starch E-Z-FILL | 30 | 30 | 15 | 15 | 7.5 | 7.5 | 0 |
| Acetylated Monoglyceride Emulsifier CETODAN® 90-50 | 0 | 2.25 | 0 | 2.25 | 0 | 2.25 | 2.25 |
| Corn syrup solids | 120 | 120 | 135 | 135 | 142.5 | 142.5 | 150 |
| Fat Blend[a] | 45 | 42.75 | 45 | 42.75 | 45 | 42.75 | 42.75 |
| Sodium citrate | 7.84 | 7.84 | 7.84 | 7.84 | 7.84 | 7.84 | 7.84 |
| Citric acid | 2.80 | 2.80 | 2.80 | 2.80 | 2.80 | 2.80 | 2.80 |
| Sodium chloride | 2.34 | 2.34 | 2.34 | 2.34 | 2.34 | 2.34 | 2.34 |

[a]Fat blend: palm olein, soybean, coconut and high oleic sunflower oils.

Samples were prepared as follows:

1) Dry blend the starch and corn syrup solids and add to 1265 g water.
2) Heat to 90–95C., hold 15 min. and cool to 65C.
3) Add the three minerals and adjust the pH to 5.1 with potassium hydroxide.
4) Blend the fat blend and acetylated monoglyceride and add to the solution.
5) Mix for three minutes prior to homogenizing twice using a first stage pressure of 3500 psig and second stage pressure of 500 psig.

Samples prepared as described above were evaluated by measuring fat globule size distribution and visually after 72 hours quiescent refrigerated storage, as shown in TABLE 10 below.

TABLE 10

Data from TABLE 9 Formulations
Varying Intact OSA Starch Levels and
Aceylated Monoglyceride Levels
Mean Fat Globule Size (Microns)

| Sample Number | Starch Level (%, w/w) | Acetylated Monoglyceride Level (%, w/w) | Mean Fat Globule Size (microns) | Visual observation (ml cream) |
|---|---|---|---|---|
| 1 | 2 | 0 | 0.527 | 0 |
| 2 | 2 | 5 | 0.468 | 0 |
| 3 | 1 | 0 | 0.508 | 1.5 |
| 4 | 1 | 5 | 0.400 | 1.5 |
| 5 | 0.5 | 0 | 0.477 | 2.0 |
| 6 | 0.5 | 5 | 0.457 | 2.0 |
| 7 | 0 | 5 | —[a] | —[a] |

[a]This sample contained significant free oil and was not analyzed.

The data of TABLE 10 demonstrated that although the acetylated monoglycerides were a poor emulsifier when used alone, the acetylated monoglycerides improved the emulsion (mean fat globule size) in each case where they were included with the intact OSA modified starch.

Example 7

A hypoallergenic infant formula was prepared in a powder form as described in TABLE 1 of Example 1 using intact OSA modified starch (National 6912, National Starch and Chemical Corporation, Bridgewater, N.J. 08807) and acetylated monoglycerides (MYVACET 9-08) as per the invention and compared to three lots of control product containing dextrinized OSA modified starch used as a sole emulsifier. The inventive products contained 60% as much starch as the control. Solids were maintained constant by adding 24 DE corn syrup solids. Acetylated monoglycerides were added at a level of 0.066% w/w, based on the total weight of reconstituted formula. The quantity of powder that did not disperse when shaken for 5 seconds or 15 seconds in a baby bottle was measured. The shaken product was poured through a fine screen and after blotting the quantity of insoluble material was weighed.

TABLE 11

Amount of Insoluble Material in Hypoallergenic Infant Formula
Powder after Reconstitution of 27 g powder in 180 ml water

| | Five (5) Second Shake | Fifteen (15) Second Shake |
|---|---|---|
| Intact starch and acetylated monoglycerides powder INVENTION | 3.39 | 1.04 |
| Control powder, lot 1 | 4.43 | 2.46 |
| Control powder, lot 2 | 6.45 | 3.48 |
| Control powder, lot 3 | 4.16 | 2.06 |

Product prepared using the intact OSA modified starch and acetylated monoglycerides had less insoluble material after 5 and 15 second shakes and/or exhibited improved mixability. Free oil associated with a poor or unstable emulsion can contribute to poor wetting and/or mixability of fat containing powders. These results unexpectedly demonstrate that inventive product containing intact OSA modified starch and acetylated monoglycerides has a superior emulsion when compared to a product using OSA modified starch as a sole emulsifier.

That which is claimed is:

1. An elemental diet composition having a pH level of between about 5 to about 6 comprising: (a) a protein source comprising an extensively hydrolyzed protein having at least about 75% of peptides with a molecular weight of less than 1000 Daltons; (b) a lipid source; (c) a carbohydrate comprising at least about 50 weight percent of glucose polymers having a degree of polymerization of from 3 to 7, said glucose polymer weight percent based on the total weight of the carbohydrate, and said glucose polymers being in the form of corn syrup solids comprising at least about 70 weight percent of the carbohydrate; and (d) an effective amount of an emulsifying system comprising intact OSA modified starch in an amount between about 0.1 to about 10 weight percent, and an acetylated monoglyceride emulsifier in an amount between about 0.01 to about 7.5 weight percent, said weight percentages of said starch and said emulsifier being based on the total weight of a ready to feed preparation of said composition.

2. A composition according to claim 1 wherein said pH level is less than 6 and greater than about 5 and said product has a mean fat globule diameter measurement of less than about 0.8 microns after said composition is subjected to post-sterilization testing.

3. A composition according to claim 2 wherein said composition is a liquid hypoallergenic formula; said protein source is present in an amount of from about 8 to about 20 percent of total calories, said lipid source is present in an amount of from about 35 to about 55 percent of total calories; said carbohydrate is present in an amount from about 35 percent to about 70 percent of total calories; said OSA modified starch is present in an amount from 0.5 to 2 weight percent, based on the total weight of a ready to feed preparation; and said acetylated monoglyceride emulsifier is present in an amount from 0.04 to 0.1 weight percent, based on the total weight of a ready to feed preparation.

4. A composition according to claim 3 wherein said OSA modified starch is present in an amount from 1 to 1.7 weight percent, based on the total weight of a ready to feed preparation.

5. A composition according to claim 4 wherein said OSA modified starch is present in an amount from 1.6 to 1.7 weight percent, based on the total weight of a ready to feed preparation; and said acetylated monoglyceride emulsifier is present in an amount from 0.05 to 0.07 weight percent, based on the total weight of a ready to feed preparation; and said pH level is about 5.5.

6. A composition according to claim 2 wherein said composition is a powder hypoallergenic formula; said protein source is present in an amount of from about 8 to about 20 percent of total calories, said lipid source is present in an amount of from about 35 to about 55 percent of total calories; said carbohydrate is present in an amount from about 35 percent to about 70 percent of total calories; said OSA modified starch is present in an amount from 0.5 to 2 weight percent, based on the total weight of a ready to feed preparation; and said acetylated monoglyceride emulsifier is present in an amount from 0.04 to 0.1 weight percent, based on the total weight of a ready to feed preparation.

7. A composition according to claim 6 wherein said OSA modified starch is present in an amount for 0.7 to 1.5 weight percent and said acetylated monoglyceride emulsifier is present in an amount from 0.04 to 0.1 weight percent.

8. A composition according to claim 7 wherein said OSA modified starch is present in an amount for 0.9 to 1.1 weight percent and said acetylated monoglyceride emulsifier is present in an amount from 0.05 to 0.07 weight percent.

9. A composition according to claim 8 wherein when reconstituted said composition will have less than about 14 g sediment per 100 g powder after reconstitution and a five second shake.

10. An elemental diet composition comprising: (a) a protein source selected from the group consisting of extensively hydrolyzed protein, free amino acids, short-chain peptides, or a mixture thereof, (b) a lipid source; (c) a carbohydrate source; and (d) an effective amount of an emulsifying system comprising intact OSA modified starch and an acetylated monoglyceride emulsifier wherein the ratio of OSA modified starch:acetylated monoglyceride emulsifier is from about 85 to about 97 parts OSA modified starch to about 3 to about 15 parts acetylated monoglyceride emulsifier.

11. An elemental diet composition having a pH level of less than about 6 and greater than about 5 comprising: (a) a protein source selected from the group consisting of extensively hydrolyzed protein, free amino acids, short-chain peptides, or a mixture thereof; (b) a lipid source; (c) a carbohydrate source comprising at least about 70 weight percent glucose polymers having a degree of polymerization of from 3 to 7; and (d) an emulsifying system consisting essentially of intact OSA modified starch and an acetylated monoglyceride emulsifier wherein the intact OSA modified starch is present in an amount ranging from 0.5 to 2 weight percent and the acetylated monoglyceride is employed in an amount ranging from 0.04 to 0.1 weight percent.

* * * * *